US010852720B2

(12) United States Patent
Dusane

(10) Patent No.: US 10,852,720 B2
(45) Date of Patent: Dec. 1, 2020

(54) SYSTEMS AND METHODS FOR VEHICLE ASSISTANCE

(71) Applicant: Harman International Industries, Incorporated, Stamford, CT (US)

(72) Inventor: Yogesh Devidas Dusane, Nashik (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 16/075,564

(22) PCT Filed: Feb. 10, 2016

(86) PCT No.: PCT/US2016/017346
§ 371 (c)(1),
(2) Date: Aug. 3, 2018

(87) PCT Pub. No.: WO2017/138935
PCT Pub. Date: Aug. 17, 2017

(65) Prior Publication Data
US 2019/0049942 A1 Feb. 14, 2019

(51) Int. Cl.
*G05D 1/00* (2006.01)
*B60W 50/10* (2012.01)
*G06F 3/16* (2006.01)
*G10L 15/22* (2006.01)
*B60R 25/04* (2013.01)
*B60R 25/25* (2013.01)
*H04W 4/48* (2018.01)
*H04W 4/90* (2018.01)

(52) U.S. Cl.
CPC ........... *G05D 1/0016* (2013.01); *B60R 25/04* (2013.01); *B60R 25/25* (2013.01); *B60W 50/10* (2013.01);
(Continued)

(58) Field of Classification Search
CPC ........ G05D 1/0016; G05D 2201/0213; H04W 4/90; H04W 4/48; H04W 4/046;
(Continued)

(56) References Cited

U.S. PATENT DOCUMENTS 5,706,399 A * 1/1998 Bareis .................... B60R 25/04
704/231
5,990,785 A * 11/1999 Suda .................... B60R 25/043
307/10.3
(Continued)

OTHER PUBLICATIONS

ISA United States Patent and Trademark Office, International Search Report Issued in Application No. PCT/US2016/17346, dated Jun. 20, 2016, WIPO, 3 pages.

*Primary Examiner* — Yazan A Soofi
*Assistant Examiner* — Naeem Taslim Alam
(74) *Attorney, Agent, or Firm* — McCoy Russell LLP

(57) ABSTRACT

Embodiments are disclosed for an example vehicle or driver assistance system for a vehicle. The example vehicle or driver assistance system includes an in-vehicle computing system of a vehicle, the in-vehicle computing system comprising an external device interface communicatively connecting the in-vehicle computing system to a mobile device, an inter-vehicle system communication module communicatively connecting the in-vehicle computing system to one or more vehicle systems of the vehicle, a processor, and a storage device storing instructions executable by the processor to receive a first command from the mobile device via the external device interface, perform a series of actions on the vehicle system until receiving a second command from the mobile device, both of the first command and the second command recognized by the mobile device based on one or more of voice commands issued by a user of the mobile device, and biometric analysis.

20 Claims, 8 Drawing Sheets

(52) U.S. Cl.
CPC .............. *G06F 3/167* (2013.01); *G10L 15/22* (2013.01); *H04W 4/48* (2018.02); *H04W 4/90* (2018.02); *G05D 2201/0213* (2013.01); *G10L 2015/223* (2013.01)

(58) Field of Classification Search
CPC ......... B60R 25/25; B60R 25/04; G06F 3/167; B60W 50/10; G10L 15/22; G10L 2015/223
See application file for complete search history.

(56) References Cited

U.S. PATENT DOCUMENTS

| | | | | |
|---|---|---|---|---|
| 9,586,596 | B2* | 3/2017 | Todasco | B60W 50/12 |
| 2005/0125110 | A1* | 6/2005 | Potter | B60R 16/0373 |
| | | | | 701/1 |
| 2007/0271022 | A1* | 11/2007 | Morisset | B60W 30/17 |
| | | | | 701/99 |
| 2009/0002145 | A1* | 1/2009 | Berry | H04W 4/48 |
| | | | | 340/436 |
| 2011/0241862 | A1* | 10/2011 | Debouk | B60W 50/035 |
| | | | | 340/439 |
| 2014/0142783 | A1* | 5/2014 | Grimm | H04W 4/48 |
| | | | | 701/2 |
| 2015/0127215 | A1* | 5/2015 | Chatterjee | B60H 1/00657 |
| | | | | 701/36 |
| 2015/0160019 | A1 | 6/2015 | Biswal et al. | |
| 2016/0046285 | A1* | 2/2016 | Kim | G08G 1/133 |
| | | | | 340/932.2 |
| 2017/0169821 | A1* | 6/2017 | Engelhardt | B60R 16/0373 |
| 2017/0374538 | A1* | 12/2017 | Gellens | H04W 4/90 |
| 2018/0226077 | A1* | 8/2018 | Choi | B60K 35/00 |
| 2018/0231979 | A1* | 8/2018 | Miller | G06Q 30/0242 |

* cited by examiner

SYSTEMS AND METHODS FOR VEHICLE ASSISTANCE

CROSS REFERENCE TO RELATED APPLICATIONS

The present application is a U.S. National Phase of International Application No. PCT/US2016/017346, entitled "SYSTEMS AND METHODS FOR VEHICLE ASSISTANCE", and filed on Feb. 10, 2016. The entire contents of the above-listed application are hereby incorporated by reference for all purposes.

FIELD

The disclosure relates to the field of vehicle-related assistance systems, and in particular to vehicle-related systems operable to promote assistance for drivers, passengers, and/or nearby individuals of a vehicle.

BACKGROUND

Vehicle or driver assistance may include any relief that is provided to an individual associated with a vehicle with the aim of increasing individual protection. Vehicle or driver assistance systems may be developed to assist the driver in situations where the driver may need assistance in contacting either emergency services or an operator in a call center. These systems are designed such that when the driver presses a button located inside the vehicle, a connection is established with one or more of the emergency services and the operator, and the driver may be able to communicate the situation and request for help.

SUMMARY

Embodiments are disclosed for an example in-vehicle computing system for a vehicle. The example in-vehicle computing system includes an external device interface communicatively connecting the in-vehicle computing system to a mobile device, an inter-vehicle system communication module communicatively connecting the in-vehicle computing system to one or more vehicle systems of the vehicle, a processor and a storage device storing instructions executable by the processor to: receive a first command from the mobile device via the external device interface, and perform actions on a selected vehicle system of the one or more vehicle systems until receiving a second command from the same mobile device, each of the first command and the second command capable of being recognized by the mobile device based on one or more of a voice command issued by a user of the mobile device, and analysis performed by the mobile device.

Methods of performing vehicle or driver assistance in a vehicle are also disclosed. An example method for an in-vehicle navigation system of a vehicle includes, receiving a start command from a mobile device of a user, receiving a vehicle data from one or more vehicle systems, the vehicle data including a speed of the vehicle, responsive to determining that the speed is above the threshold speed, adjusting vehicle operation to reduce the speed over a predetermined time, and performing actions on the vehicle systems once the speed is below the threshold speed.

Embodiments are disclosed for an example mobile device. The example mobile device includes a sensor module communicatively coupled to sensors of the mobile device, a communication module configured to receive information from a user of the mobile device and transmit information to an in-vehicle computing system of a vehicle, a processor, and a storage device storing instructions executable by the processor to: identify a current situation based on a change in parameters, the change determined based on an output of the sensors, present a notification of an impending start command to the user, in response to receiving a stop command from the user, not sending the start command to the in-vehicle computing system of the vehicle, and if the stop command is not received within a threshold time from the user, send the start command to the in-vehicle computing system of a vehicle via the communication module, the start command configured to cause an action in the vehicle.

BRIEF DESCRIPTION OF THE DRAWINGS

The disclosure may be better understood from reading the following description of non-limiting embodiments, with reference to the attached drawings, wherein below.

DETAILED DESCRIPTION

As described above, vehicle or driver assistance solutions offer aid to individuals related to a vehicle (e.g., drivers, passengers, nearby pedestrians, etc.) by contacting the appropriate authority and services. The present disclosure describes a system that includes a mobile device that communicatively connects to an in-vehicle computing system. The mobile device may be able to recognize that a user of the mobile device needs assistance based on a voice command that the device receives from the user, and deduce a panic situation. Upon recognizing the voice command, the device may communicate to the in-vehicle computing system and issue a "Start" command, which in turn, may allow the system to perform a sequence of actions to ensure assistance for the user. The mobile device may additionally or alternatively be able to deduce panic situations based on sudden/unexpected changes in parameters of the user and the mobile device. Based on the changes, the mobile device may further issue the "Start" command to the in-vehicle computing system. At any point in the sequence, the system may be interrupted by a "Stop" command issued by the same mobile device. However, the mobile device may issue the "Stop" command only if the command is provided by the user of the mobile device. The sequence of actions performed by the in-vehicle system may include contacting emergency services, unlocking the windows and doors of the vehicle, issuing audio/visual alerts, and the like. In this way, by taking over control of the situation and performing appropriate actions, the system may be able to automatically provide the user with the much needed assistance in a hands-free manner. Further, by enabling voice-based communication between the user and the mobile device, the communication is more personalized and tamper-proof.

Figure 1:
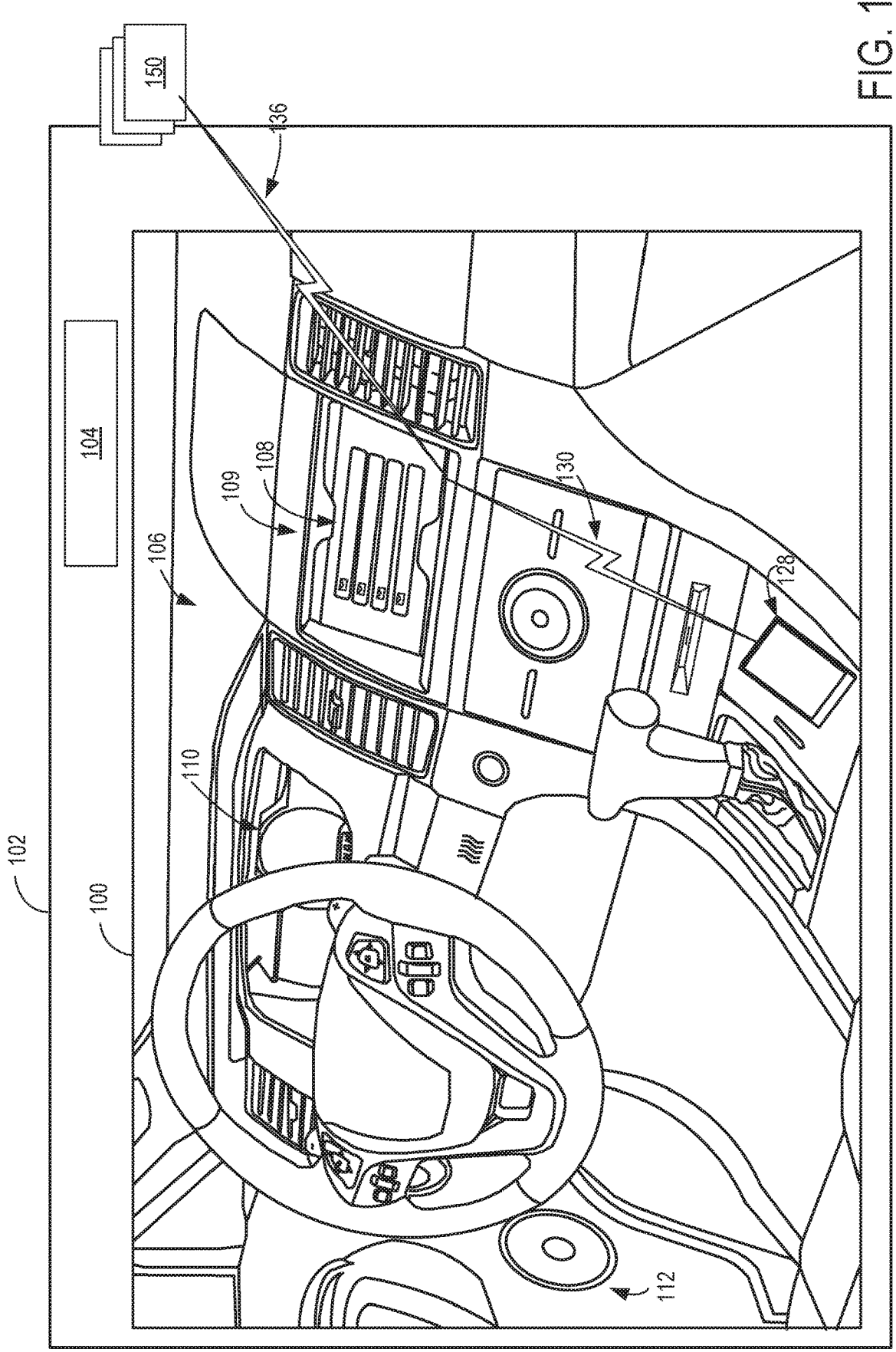
FIG. 1 shows an example partial view of a vehicle cabin in accordance with one or more embodiments of the present disclosure.

FIG. 1 shows an example partial view of one type of environment for a vehicle or driver assistance system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Vehicle 102 may be a leading vehicle or a trailing vehicle. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver and/or passenger (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle occupant may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. As such, the mobile device 128 may include multiple mobile devices that may be able to independently connect to the in-vehicle computing system. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces/modules for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device. The mobile device 128 may include sensors communicatively coupled to the device via sensor subsystems/modules for example. Examples of sensors include, but are not limited to, heart rate/pulse rate sensors, temperature sensors, audio sensors, motion sensors, and the like. The mobile device 128 may be configured to recognize voice commands issued by the user and communicate commands to and from the in-vehicle computing system. The mobile device may be further configured to infer user condition and situation based on the output of one or more sensors.

In-vehicle computing system 109 may also be communicatively coupled to additional devices operated and/or accessed by the user but located external to vehicle 102, such as one or more external devices 150. In some examples, external devices may include operator centers, emergency services, and the like. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some example embodiments, the in-vehicle computing system 109 may perform a series or sequence of actions based on a start command received from the mobile device 128, and further stop performing the device based on a stop command received from the mobile device 128. In some embodiments, all or a portion of the assessment may be performed by the mobile device 128 and/or the external devices 150. In some embodiments, the external devices 150 may include in-vehicle computing devices of another vehicle, as such the vehicle may be a vehicle in the vicinity of the vehicle 102, or may be emergency vehicles, and the like.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
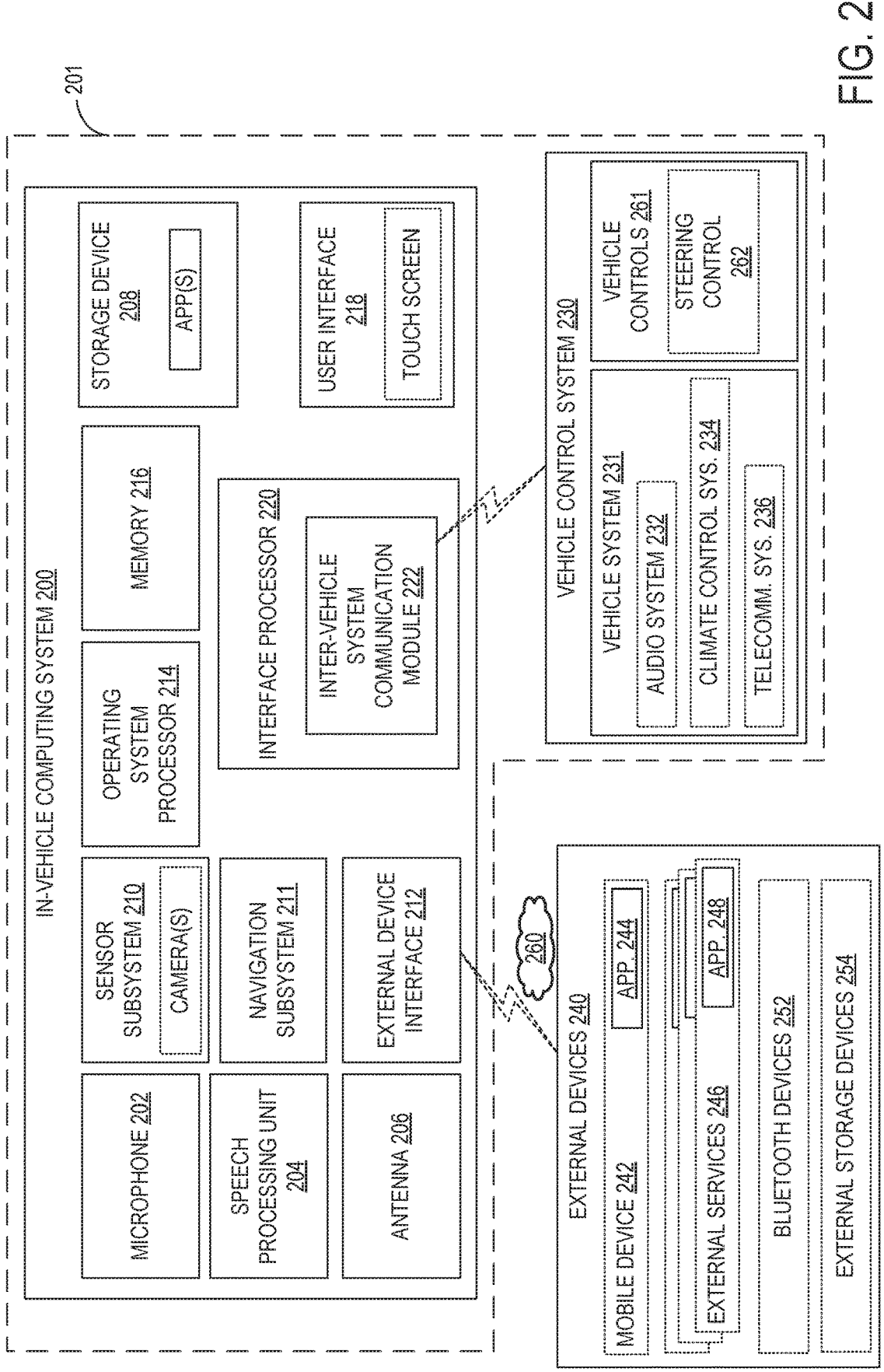
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the user. For example, the external device interface 212 may enable phone calls to be established and/or text messages (e.g., SMS, MMS, etc.) to be sent (e.g., via a cellular communications network) to a mobile device associated with a contact of the user. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200. As another example, the mobile device application 244 may be operated to store voice commands for specific situations like emergency, panic situations, and the like.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Often times, situations may arise, wherein a user may require assistance while travelling in a vehicle. For example, when seated inside a cab or taxi, there may be instances when a passenger may be feel threatened. During situations when being robbed or kidnapped or harassed by driver and/or fellow passengers, the passenger may feel threatened. Such situations may not necessarily be restricted to only cabs or taxis. At some instances, a person driving the vehicle may face sudden health issues, which may affect the person's ability to drive the vehicle as well as contact emergency services. During such situations, the user may desire to contact emergency services/operator of a call center to request for assistance.

Typically, vehicles are equipped with a button located inside the vehicle, which when pressed directly contacts call centers, or in some cases, even emergency services. But it is not always possible to locate the button. In addition, the button may be easily tampered with and or disabled. Further, it may not always be feasible for the user to reach and press the button. As an example, when the passenger is sitting in the backseat of the vehicle and is being harassed by fellow passengers, it may not be possible for the passenger to reach out and press the button located in the front of the vehicle. Furthermore, the passenger may desire to call emergency services or request for help without alerting the other passengers in the vehicle. In such situations, pressing the button inside the vehicle without alerting the others may not be possible. In other examples, when the person driving the vehicle experiences sudden giddiness or tightness in the chest, the person may be bending over in an awkward position such that reaching and pressing the button to call for medical help may not be possible.

In case of emergency/panic situations, it may be advantageous to have a hands-free way of contacting emergency services. For example, it may be desirable to store voice commands in the user's mobile device to be retrieved during such emergency situations. An example mobile device is shown in FIG. 7.

Figure 7:
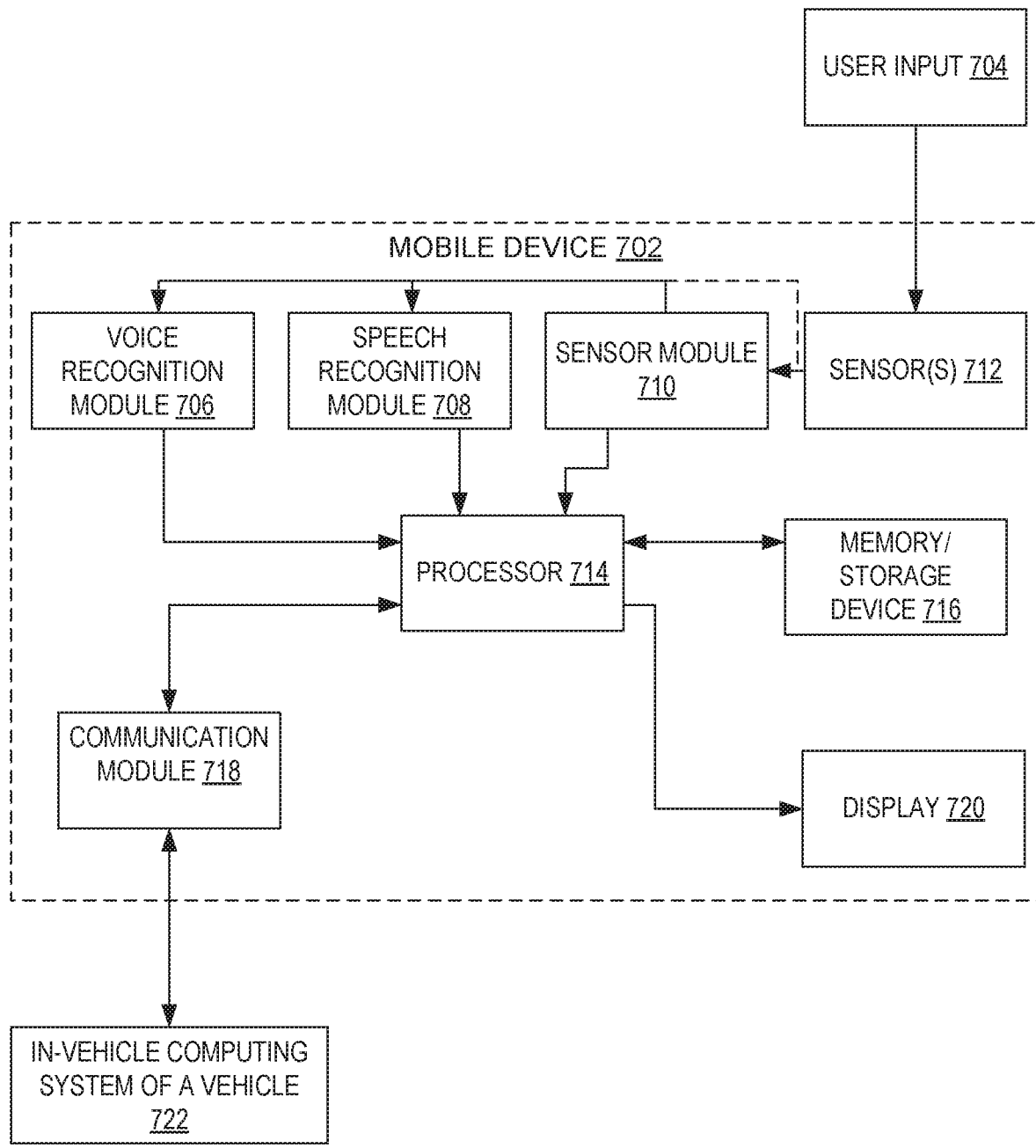
FIG. 7 shows an example mobile device in accordance with one or more embodiments of the present disclosure.

Turning now to FIG. 7, mobile device 702 may be an example of mobile device 128 of FIG. 1, and/or mobile 242 of FIG. 2, and may be configured to perform one or methods described here within. The mobile device 702 may include a display 720, a processor 714, and a memory/storage device 716. The mobile device 702 may include a sensor module communicatively coupled to sensors 712. Examples of sensors may include touch sensors, audio sensors, biometric sensors such as heart rate monitors, temperature sensors, motion sensors, image sensors, and the like. For example, the mobile device 702 may include a microphone to detect ambient noise levels, and user voice/volume levels. The mobile device may include a heart rate monitor that may be able to determine a resting heart rate of the user, for example. Similarly, a temperature sensor may be able to determine a body temperature of the user. As such, based on the inputs from the sensor, the sensor module may be able to monitor the outputs of the sensors, and further detect any unusual activity or spiking in the sensor outputs. Based on a motion sensor input, the mobile device may be able to determine a position/movement of the mobile device. If the mobile device falls or is thrown, the sudden spiking in the output of the motion sensor may be detected by the sensor module, for example. In this way, the mobile device may be able to determine if there is any sudden change in parameters such as heart rate, temperature, voice levels, movement, and the like. The mobile device may then be able to send a panic start command to an in-vehicle computing system 722 of a vehicle via a communication module 718. As such, the in-vehicle computing system 722 of the vehicle may be an example of the in-vehicle computing system 109 of FIG. 1, and/or in-vehicle computing system 200 of FIG. 2. The mobile device 702 may communicate with the in-vehicle computing system 722 either wirelessly or via connectors without departing from the scope of this disclosure. For example, the mobile device may communicate with in-vehicle computing system through external device interface over a network, a universal serial bus (USB) connection, a direct wired connection, a direct wireless connection, and/or another communication link.

The user of the mobile device may be able to store voice commands for specific situations in the memory (e.g., memory/storage device 716) of the mobile device. The mobile device 702 may further include voice recognition module 706 and speech recognition module 708. For example, the user may vocalize a specific panic start command (e.g., provide voice input to one of the sensors 712) for storage in the mobile device. Similarly, the user may vocalize a specific panic stop command for storage in the mobile device. When the user later utters the panic commands (after the commands have been stored in the mobile device), the mobile device may be able to recognize the commands and further communicate to the in-vehicle computing system to perform actions such as requesting for assistance, for example. As such, the voice recognition module 706 may be able to identify the user's voice when the user utters a voice command. For example, audio data corresponding to the user's utterance may be captured by one or more of the sensors 712 and passed to voice recognition module 706 directed and/or via sensor module 710. The audio data may be compared to representative audio data retrieved by the voice recognition module in order to identify a user to which the audio data belongs. Any suitable voice recognition routine or combination of routines may be utilized to identify a user that provided the captured audio data.

In addition to the voice recognition, the content of the command may be recognized by the speech recognition module 708. For example, the audio data corresponding to the user's utterance may be captured by the one or more sensors 712 and passed to speech recognition module 708 directly and/or via sensor module 710. In some examples, the speech recognition module and voice recognition module may operate in a coordinated manner. For example, a user's identity may be used to fine tune speech recognition (e.g., different speech recognition models may be used for different identified users in order to compensate for the users' accents, ages, speech patterns, and/or other parameters). As another example, the voice recognition may be utilized to tailor a response to recognized speech. For example, upon recognition of a valid stop command by the speech recognition module 708, the audio data associated with the stop command may be compared to a previously-uttered start command (e.g., a most recently-uttered start command that was not followed by a stop command) to determine if the same user uttered both commands. In this example, voice recognition may be performed in a relative, rather than absolute, manner (e.g., voices are recognized in relation to one another, rather than a stored user identity).

Thus, when faced with a panic situation, the user may be able to utter the panic start command, and trigger the mobile device to send out a start command to the in-vehicle computing system. The in-vehicle computing system 722 may perform one or more actions, and ensure that the user is protected and assisted in a timely manner. In a similar way, when the user utters the stop command, the mobile device may recognize the voice and the content and trigger a stop command to the in-vehicle computing system, which in turn may then stop the actions. The mobile device will not issue a stop command to the in-vehicle computing system if the mobile device receives voice command from anyone else other than the user that issued the start command (e.g., the user of the mobile device). In this way, the mobile device is able to store and retrieve personalized commands.

Figure 3:
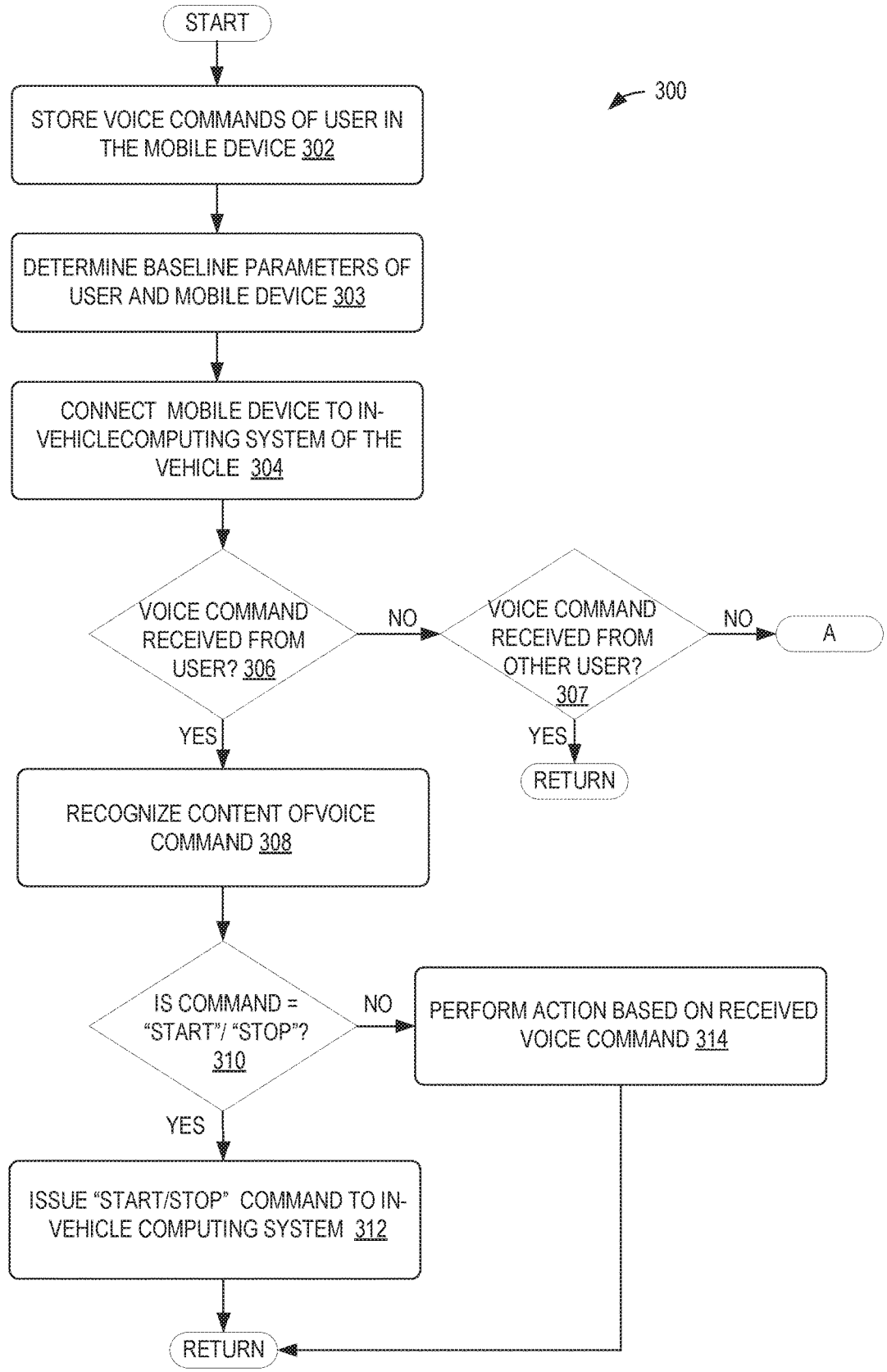
FIG. 3 shows a flow chart of an example method performed by a mobile device of a user for recognizing voice commands issued by the user and communicating a start command to the in-vehicle computing system in accordance with one or more embodiments of the present disclosure.
Figure 4:
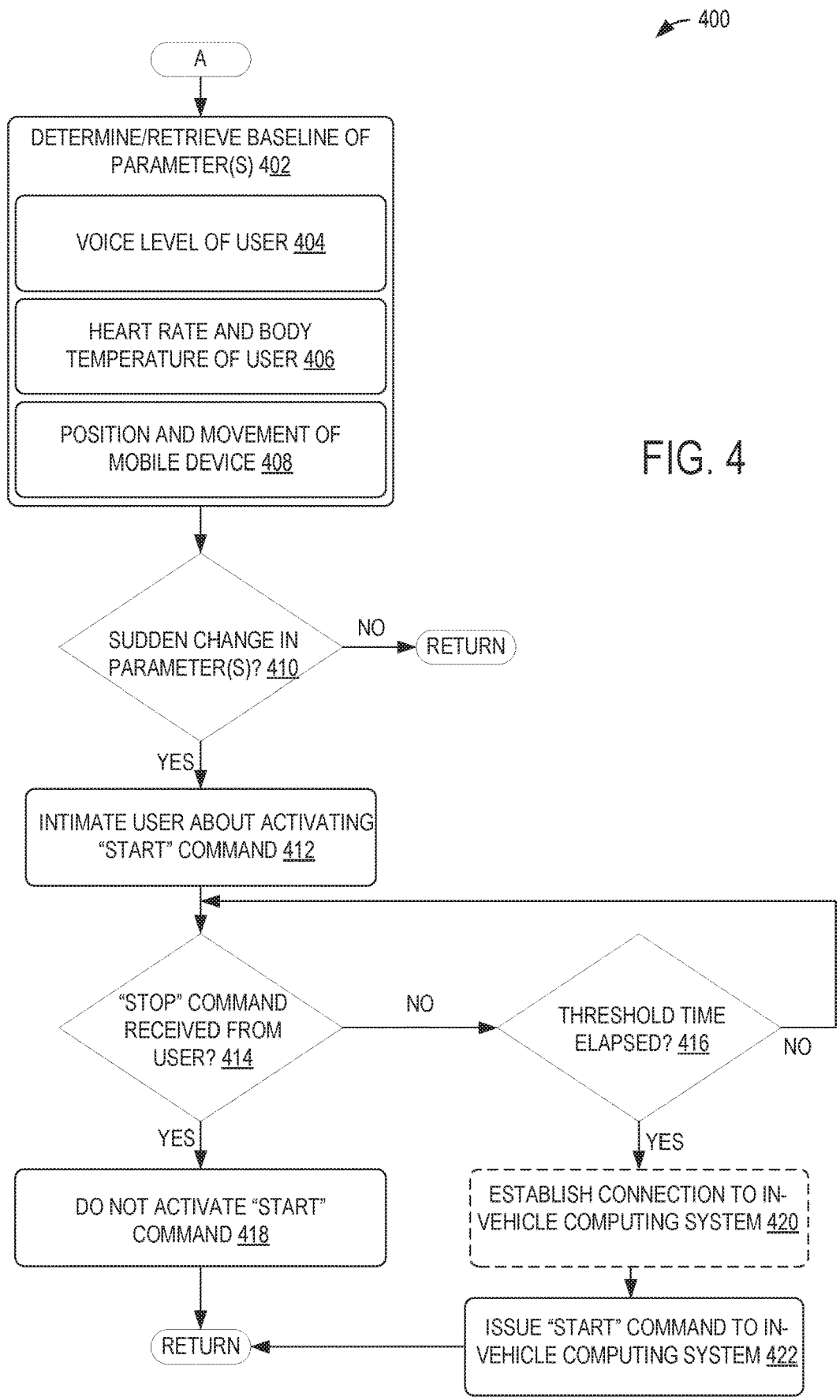
FIG. 4 shows a flow chart of an example method performed by the mobile device for generating the start command based on detecting any sudden changes in one or more parameters and further communicating the start command to the in-vehicle computing system in accordance with one or more embodiments of the present disclosure.

Example methods performed by the mobile device to recognize panic situations based on one or more of voice commands and sudden changes in parameters is described in FIGS. 3 and 4. Turning now to FIG. 3, it shows an example method 300 performed by a mobile device of a user for recognizing voice commands issued by the user and communicating a start or a stop command to an in-vehicle computing system in accordance with one or more embodiments of the present disclosure. Specifically, the method includes identifying a voice command issued by the user, and subsequently communicating the specified command to the in-vehicle computing device. The voice command may include a start command that indicates the start of a panic situation. The voice command may further include a stop command that indicates the cessation or stop of the panic situation. In some examples, method 300 may be performed by a mobile device of the user, the mobile device including, but not limited to, smart phone, a tablet, a laptop computer, a wearable device, a portable media player, and/or any suitable mobile computing device. The mobile device may be an example of the mobile device 128 of FIG. 1, mobile device 242 of FIG. 2, and/or mobile device 702 of FIG. 7 and may perform methods 300 and 400 described below. As described previously, the device may include a sensor module communicatively coupled to sensors of the mobile device. The mobile device may further include a communication module configured to receive and transmit specific commands to an in-vehicle computing system of a vehicle. The mobile device may further include a processor that may be configured to perform the methods described in FIG. 3 and FIG. 4.

Method 300 begins at 302 by storing voice commands of the user in a memory of the mobile device. The mobile device may be capable of storing, processing, and recognizing certain voice commands. As an example, a user of a mobile device may be able to store voice commands for specific tasks. For example, the user may say and record "Open Sesame" to use as a start command for emergency or panic situations. The user may further say and record "Close Sesame" to use as a stop command for the emergency situation. In some examples, "Panic Start" may be the start command, and "Panic Stop" may be the stop command. In some more examples, sequence of numbers, dates, names of people/objects, and the like may be used as the start and stop commands. It may be noted that the examples for voice commands referred here are non-limiting examples of voice commands that may be stored in the mobile device. Various other words or combinations of words may be used as start and stop commands without deviating from the scope of the disclosure. In this way, the mobile device may build a database that stores start and/or stop commands recorded by one or more users, where each start and/or stop command is linked (e.g., tagged) to an associated user in the database.

There may be certain criteria for selecting start and stop commands, for example. One example criteria may include that the start command be distinct from the stop command. As such, the same word or sequence of words may not be used for both the start and the stop command. It may be advantageous for the user to select the start and stop command that are easier to recall when faced with panic situations.

Once commands are provided that meet the criteria, the commands may be stored in a memory of the mobile device. Method 300 then proceeds to 303. At 303, the method includes determining baseline levels of parameters of the user and the mobile device. Determining baseline parameters of the user may include determining baseline levels of biometric identifiers unique to the user, such as heart rate, body temperature, pulse rate, voice level, voice tones, and the like. As such, the mobile device may include sensors that are able to determine each of the above mentioned parameters and store the baseline values in memory of the mobile device. In some examples, the mobile device may be configured to generate the baseline values of each of the above mentioned parameters during different conditions, and further to generate a database of parameters specific to the user. For example, the user may exercise every day at 8 in the morning for about an hour. Right after the exercising, the user may have elevated heart rate. As such, the mobile device may be able to determine the heart rate, and further associate the elevated heart rate with historical data, thus determining that the heart rate elevation is due to exercise. In a similar way, the mobile device may be able to associate any changes in body temperature, body temperature, pulse rate, voice levels, and the like, with the user's behavioral pattern, for example. As such, the mobile device may be adaptively learn and update the baseline of the parameters based on any change in user activity pattern.

In addition to the biometric identifiers discussed above, the mobile device may also be able to determine baseline levels of parameters for the mobile device. The baseline parameters of the mobile device may include a position and a movement data of the mobile device. As such, the position and movement data of the mobile device may be determined based on the output of sensors located in the mobile device. The position and the movement data of the mobile device may typically correlate with the position and movement of the user. For example, if the user is driving in a car, and mobile device (such a mobile phone) is in the user's possession, then the position and the movement data of the mobile device may be the same as the position and the movement data of the user. By monitoring position and movement of the mobile device, any unexpected or unusual activity/pattern may be detected by the mobile device and perceived as a panic situation.

Once the baseline of parameters of both the user and the mobile device are determined at 303, method 300 proceeds to 304, where the mobile device connects to an in-vehicle computing system of a vehicle. For example, when the user is within a threshold distance from a vehicle, the mobile device may be able to connect to the in-vehicle computing device of the vehicle wirelessly (via Bluetooth, for example). In an example scenario, while the user is waiting for a cab, when the cab is within the threshold distance from the user's mobile device, the mobile device may be able to establish connection to the in-vehicle computing system of the cab at 304. The mobile device may be able to establish connection with the in-vehicle computing when a strength of a wireless signal between the mobile device and the in-vehicle computing device reaches a threshold strength. If there are more than one users/passengers in the vehicle, the mobile device of each of the users may be able to connect to the in-vehicle computing system. Said another way, the in-vehicle computing system may be able to connect to multiple mobile devices simultaneously, and may further be capable of identifying and isolating commands from each of the mobile devices.

As another example, the user may decide if a connection between the mobile device and in-vehicle computing system ought to be established. For example, if the user is travelling with a friend, the user may decide not to connect the mobile device to the in-vehicle computing device of the friend's vehicle at 304. However, if, during the ride, there arises a situation wherein the user gives a start command, because of a medical emergency, for example, then the mobile device may automatically connect to the in-vehicle computing system and perform certain actions (as described with reference to FIGS. 5A, 5B, and 6).

Method 300 then proceeds to 306, where it is determined if a voice command is received from the user. The user refers to the user of the mobile device (e.g., a user that has stored voice commands, such as "Start" and "Stop" commands at the mobile device). At 306, the method may match the voice of the voice command received in 306 with the voice of the user stored in the memory of the mobile device. If the voice matches, indicating that the voice command is received from the user (e.g., "YES" at 306), then method 300 proceeds to 308, where the method includes recognizing the content of the voice command of the user (also referred to as command recognition). The mobile device may include speech recognition modules and voice user interfaces that enable recognition and deciphering of voice commands.

Method 300 then proceeds to 310, where it may be determined if the voice command received from the user at 306, is a "Start" or a "Stop" command. As such, the "Start" and the "Stop" command may be specific for emergency or panic situations. The "Start" and the "Stop" command may be also referred to as panic commands, wherein the "Start" may refer to the start of the panic command, and the "Stop" may refer to the stop or cessation of the panic command.

If the voice command received from the user is a "Start" or "Stop" command (e.g., "YES" at 310), then method 300 proceeds to 312, where the "Start" or "Stop" command is communicated to the in-vehicle computing system and the method returns. As explained earlier, if the mobile device is not previously connected to the in-vehicle computing system, the method may include connecting the mobile device to the in-vehicle computing system first, and then issuing the "Start" or "Stop" command to the in-vehicle computing system.

If the voice command received is not a "Start" or a "Stop" command (e.g., "NO" at 310), then method 300 proceeds to 314, where the actions based on the received voice command may be performed. For example, if the voice command is "Make a call" or "Send a Text" or "Send an email", then appropriate actions such as making a call, sending a text/email, may be taken at 314, and the method returns. It is to be understood that the method may return to any earlier block, such as block 306 to continue monitoring for voice commands from a user.

During command recognition, the method may be able to determine the content of the voice command. However, if the voice command is not received from the user of the mobile (e.g., "NO" at 306), then method proceeds to 307 where it is determined if the voice command is received from another user (e.g., a user that has not recorded commands to the mobile device and/or is not recognized by the mobile device). If "YES" at 307, then method may simply return (e.g., to continue monitoring for voice commands), reject/discard the command received form the other user and then return, store the voice command for later retrieval, and/or prompt the new user to identify himself/herself to the mobile device.

There may be situations when the user may not be able to utter the appropriate voice command and request help. For example, when a voice command is not received from the user (at 306) or any other user (at 307), method 300 proceeds to FIG. 4 wherein the mobile device may be able to detect panic situations based on any changes to the baseline parameters, for example, by performing method 400 of FIG. 4 as described below.

Turning to FIG. 4, it shows an example method 400 performed by the mobile device for generating the start command based on detecting any sudden changes in one or more parameters and further communicating the start command to the in-vehicle computing system in accordance with one or more embodiments of the present disclosure. Specifically, the method includes determining if the user is in a panic situation based on a sudden increase in heart rate, body temperature, voice level, and the like. The method may further determine a panic situation if there is any abrupt change in movement or position of the mobile device.

It may be noted that the mobile device may perform methods 300 and 400 in any order. In a first example, the mobile device may perform method 300 to check for voice commands before proceeding to method 400 to check for changes in sensor parameters. In a second example, the changes in sensor parameters may be checked prior to checking for voice commands. In such an example, method 400 may be performed first, and then followed by method 300. In a third example, an interruption (e.g., a detection of a panic condition based on an utterance of the start command and/or a change in parameter of the user/mobile device) may cause the mobile device to switch from one method to the other. Method 400 may be performed continually, for example. But when a voice command is received (e.g., an interruption), then method 400 may be interrupted, and at least a portion of method 300 may be performed (e.g., the mobile device may begin executing method 300 at 304 or 306). Similarly, while performing method 300, if there is a sudden increase in voice level of the user (user screaming, for example), method 300 may be interrupted and at least a portion of method 400 may be performed.

Turning to FIG. 4, method 400 begins by determining or retrieving baseline parameters at 402. As explained earlier, with regard to 303 of method 300, determining baseline of parameters includes determining a baseline of parameters of the user and a baseline of parameters of the mobile device. In some examples, the parameters of the user such as a voice level, a heart rate, pulse rate, body temperature, and the like may be continuously monitored and the baseline values constantly updated at 404 and 406. Similarly, a position and a movement of the mobile device may be continuously monitored and updated at 408. Updates to the baseline may be stored, for example on in a memory of the mobile device. In other examples, the baseline of the parameters determined in 303 of method 300 may be retrieved at 402. For example, a stored baseline voice level/tone may be retrieved at 404. Likewise, a stored resting heart rate and/or average body temperature of the user may be retrieved at 406. A stored current position/location/movement of the mobile device may be updated/retrieved from history at 408.

Next, at 410, method 400 includes determining if there is a sudden change in the parameters determined or retrieved in 402. A sudden change may be determined based on an increase in the levels of the parameters to above threshold levels within a threshold duration. The threshold duration may be set to detect any rapid changes, for example. A user screaming, and/or user heart rate increasing rapidly, and/or user pulse rate spiking and/or any unusual changes in position and movement of the mobile device and the like may be construed as a sudden change in the parameters. Similarly, when the pulse or heart rate increases or decreases suddenly, due a medical condition, for example, the increase or decrease in the pulse or heart rate may be interpreted as a sudden change in the parameters at 410. However, any gradual change in the parameters may not be considered as a sudden change. For example, if the user has a fever, body temperature increases gradually, then the gradual increase in body temperature may not be regarded as a sudden change. Accordingly, both an absolute value of the parameters and a rate of change of the parameters may be evaluated and compared to relevant thresholds in order to determine deviations (e.g., sudden changes) indicative of an emergency condition.

If there is no sudden change in the parameters when checked at 410 (e.g., "NO" at 410), then method returns (e.g., to continue monitoring parameters and/or monitoring for a voice command). However, if there is a sudden change (e.g., "YES" at 410), then method 400 proceeds to 412 where the method includes intimating the user about the possibility of activating a "Start" command. As such, the mobile device may intimate the user about the device's intention to activate the "Start" command by continuous beeping and/or vibrating and/or flashing lights and the like. The method then proceeds to 414.

At 414, the method includes determining if a "Stop" command is received from the user. Determining if a "Stop" command is received from the user at 414 includes both identifying the voice of the user, and further matching the "Stop" command issued by the user with the "Stop" command stored in memory (e.g., for that user). If the "Stop" command is received from the user of the mobile device (e.g., "YES" at 414), thereby indicating that the situation was falsely identified as a panic situation, the method proceeds to 418 to not activate the "Start" command (e.g., to cancel the issuance of the start command and/or to prevent the start command from being sent to the in-vehicle computing system). However, if a "Stop" command was not received from the user at 414 (e.g., "NO" at 414), then method proceeds to 416 to determine if a threshold period of time has elapsed. For example, a threshold period of time may be set to allow the user to issue the stop command before the mobile device proceeds to issue the start command to the in-vehicle computing system. As explained below, method 400 will proceed to 416 when no stop command is received, when a wrong stop command is received from the user, or when the stop command is received from any other user other than the user of the mobile device.

For example, if the heart rate of the user spikes suddenly, the mobile device may identify the situation as a panic situation, and may intimate the user about the intention to send a "Start" command to the in-vehicle computing system (e.g., by displaying or otherwise outputting a warning indicating that a panic start command will be issued). However, the user may have been watching a scary movie in a drive-in theatre and the sudden spike in heart rate may be the result of a scary scene in the movie, for example, and hence may be a false alarm. In such a situation, when the mobile device intimates the user by continuous beeping and/or vibrating and/or flashing lights and the like, the user may be able to issue the "Stop" command to stop the device from sending the panic start command to the in-vehicle computing system. In order for the user to stop the mobile device from communicating the panic start command to the in-vehicle computing system, the user will have to utter the personalized stop command that the user stored (at 302, of FIG. 3, for example). If, for example, a second user who knows the personalized stop command of the user utters the stop command, the mobile device will not accept the stop command (due to the stop command being issued from a user other than the user that stored that stop command) and proceed to 416 to determine if a threshold time has elapsed. Further, if the user utters a stop command that differs from what is stored as the panic stop command for that user, the device may not accept the stop command and the method may still proceed to 416.

To summarize, the method may proceed to not activating/issuing the "Start" command to the in-vehicle computing system only when the "Stop" command is issued by the user (the same user of the mobile device, and not any other user, for example). In addition to the same user giving the command, the user issued "Stop" command must match the panic stop command stored in memory.

The method will further discard all commands received from any other users, irrespective of whether the command matches the panic command stored in memory. To elucidate further, the panic stop command for a first user may be "Close Sesame" and while sharing a cab with a second user (who happens to be a colleague of the first user), the first user may experience harassment from the second user. Based on a spiking of the first user's heart rate, the mobile device of the first user may alert the first user about issuing a "Start" command to the in-vehicle computing device of the cab, for example, by continuous beeping. However, the second user may be able to recall from earlier conversations with the first user about the panic stop command, and may guess and utter "Close Sesame" to stop the sequence of actions. Though the correct stop command was issued by the second user, the mobile device will still disregard the stop command, as the mobile device may be able to recognize that the stop command did not originate from the first user.

As discussed above, at 416, method 400 includes determining if a threshold time has elapsed since intimating the user about activating the "Start" command at 412. The threshold time may be predefined/default time that the mobile device may be programmed to wait for a "Stop" command from the user. During this time, the user may be able to decide if the device has falsely detected the situation as a panic situations. If it is a false alarm, them the user may be able to issue a "Stop" command and stop activating the "Start" command. For example, if threshold time has not elapsed (e.g., "NO" at 416), then method 400 returns to 414, and waits for the "Stop" command from the user. However, if the threshold time has elapsed (e.g., "YES" at 416), and then method 400 proceeds to 422 wherein a "Start" command is issued to the in-vehicle computing system of the vehicle. If a connection between the in-vehicle computing system and the mobile device exists, then the method includes directly proceeding to 422 from 416. However, if a connection between the in-vehicle computing system of the vehicle and the mobile device does not exist, the method 400 proceeds first to 420 where a connection between the two may be established and then method 400 proceeds to 422 to issue the "Start" command to the in-vehicle computing system and the method ends.

Thus, an example mobile device may include a sensor module communicatively coupled to sensors of the mobile device, a communication module configured to receive information from a user of the mobile device and transmit information to an in-vehicle computing system of a vehicle, a processor, and a storage device storing instructions executable by the processor to identify a current situation based on a change in parameters, the change determined based on an output of the sensors, and present a notification of an impending start command to the user. Additionally or alternatively, in response to receiving a stop command from the user, the instructions may include not sending the start command to the in-vehicle computing system of the vehicle, and if the stop command is not received within a threshold time from the user, then send the start command to the in-vehicle computing device of a vehicle via the communication module, the start command configured to cause an action in the vehicle. Additionally or alternatively, the instructions are further executable to discard the stop command if the stop command is different to a first stop command stored in the mobile device, the first stop command being selected by the user, and further discard the stop command if the stop command is given by a different user. Additionally or alternatively, the sensors may include one or more of a heart rate monitor, a temperature sensor, a motion sensor, and an audio sensor. Additionally or alternatively, the parameters may include one or more of a voice level of the user, a heart rate of the user, and a body temperature of the user, based on the output of the sensors, and wherein the change includes the parameters varying by threshold amounts within a threshold duration. Additionally or alternatively, the stop command may be configured to stop the action in the vehicle.

As described earlier, the in-vehicle computing system may be able to connect multiple devices simultaneously. However, the in-vehicle computing system may be able to uniquely identify each users' mobile device; and this may be achieved by handshaking between the devices after connection is established. Further, during handshaking, the mobile device detects that it is connected to the in-vehicle computing system and that the in-vehicle computing system may be able to provide emergency assistance and hence the mobile device may activate some of its features (such as enabling microphone to take user commands, communicating with the on-vehicle computing system on priority etc.). The in-vehicle computing device may be able to receive commands independently from each of the connected mobile devices.

Some example scenarios are discussed below. Consider an example situation wherein the user is travelling to a destination in a taxi. However, the taxi driver is intoxicated and is harassing the user, and as a result, the user's pulse rate or heart rate increases. Based on the spiking in the pulse and/or heart rate, the mobile device may alert the user about initiating the "Start" command to the in-vehicle computing device of the vehicle (the taxi, in this case). The user may not wish to stop the mobile device, and may just remain silent. When the mobile device has not received a response from the user within a threshold time (2 minutes, for example), the mobile device may activate the "Start" command, and communicate the "Start" command to the in-vehicle computing system.

In another example, consider a situation when the user is being kidnapped in a vehicle. While inside the vehicle, a fellow passenger may have grabbed the mobile device of the user and flung it across the seat. Detecting the sudden movement of the mobile device as a sudden change in the parameter associated with position/movement of the device, the mobile device may intimate the user about activating the "Start" command discretely by continuous beeping or flashing lights. Further to not receiving any response from the user, the device may communicate the "Start" command to the in-vehicle computing system.

Consider another example situation, when the mobile device falls to the floor of the vehicle. Detecting the sudden movement, the mobile device may falsely recognize the situation as a panic situation and may intimate to the user that a "Start" command will be issued to the in-vehicle computing device. However, the user may be able to stop the activation of the panic start command, by uttering the "Stop" command for the mobile device.

Thus, in this way, the mobile device may be able to detect and determine panic situations based on user voice command or intelligently perceive and deduce panic situations based on unusual movements/heart rates/pulse rates, etc. By further personalizing each of the "Start" and the "Stop" commands, the mobile device may be able to selectively start and stop the panic commands based on user inputs. Further, if there is no response from the user for a threshold time, the mobile device may directly send panic commands to the in-vehicle computing systems and request for assistance via the in-vehicle computing system as described in detail with reference to FIGS. 5A and 5B.

Figure 5A:
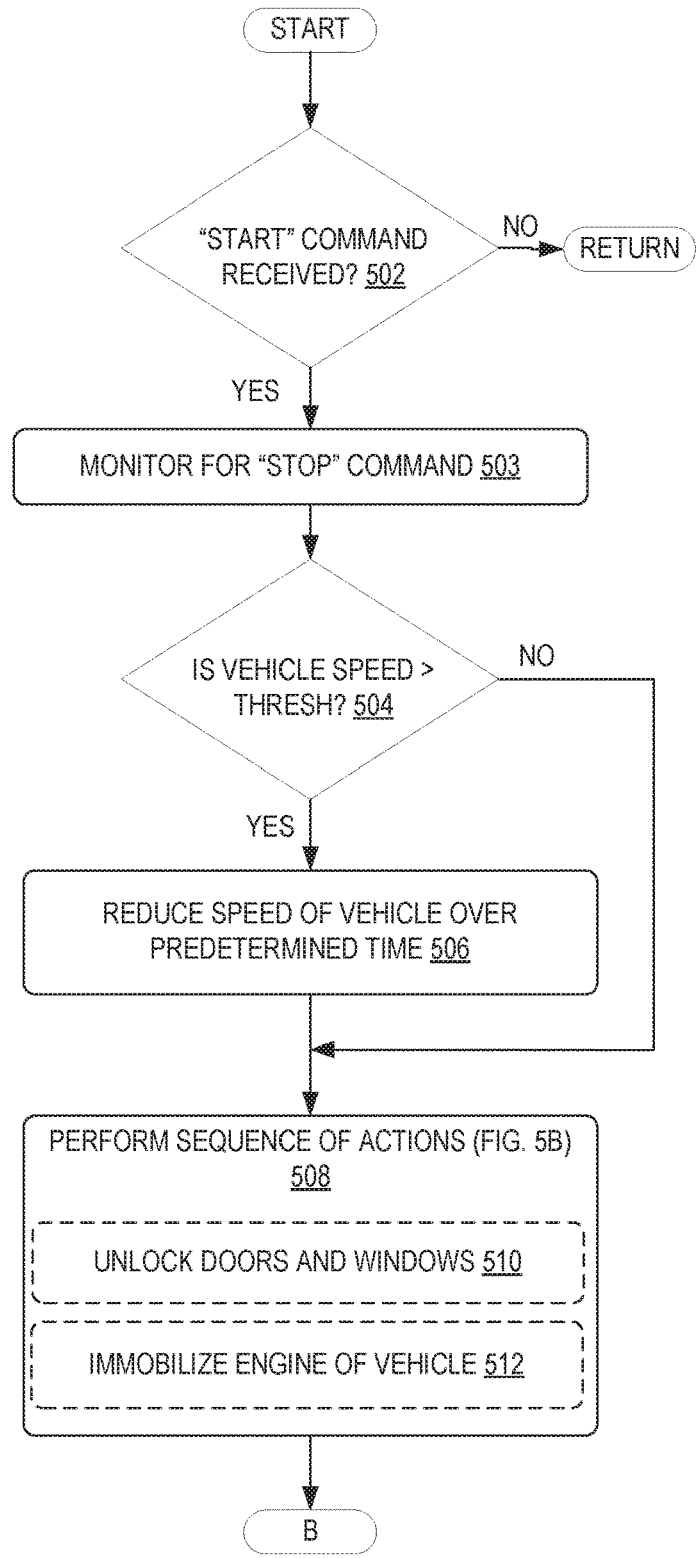
FIGS. 5A-5B show flow charts of an example method performed by the in-vehicle computing system for checking a vehicle speed upon receiving the start command from the mobile device and performing a sequence of actions, in accordance with one or more embodiments of the present disclosure.

Turning now to FIG. 5A, it includes an example method 500 performed by the in-vehicle computing system (such as in-vehicle computing system 109 of FIG. 1 and/or in-vehicle computing system 200 of FIG. 2) for checking a vehicle speed upon receiving the start command from the mobile device in accordance with one or more embodiments of the present disclosure. Specifically, the method includes performing a sequence of actions when a panic start command is received from a mobile device of a user.

Method begins at 502 by determining if a "Start" command is received from the mobile device (such as mobile device 128 of FIG. 1, and/or mobile device 242 of FIG. 2). As such, a panic "Start" command may have originated due to any of the prior-described methods 300 and 400 (e.g., based on the user uttering the phrase and/or the sensor readings indicating a panic situation without the user cancelling it). If the "Start" command is not received from the mobile device of the user, then method returns to continue monitoring for receipt of the "Start" command. However, if "Start" command is received from the mobile device of the user (e.g., "YES" at 502), then method 500 proceeds to 503 to monitor for a "Stop" command. It is to be understood that the monitoring for a "Stop" command may be continuous, such that the receipt/detection of a valid "Stop" command (e.g., a "Stop" command uttered by the user that uttered the "Start" command at 502 and associated with that "Start" command) causes an interruption to method 500. For example, if, at any point during execution of method 500, a valid "Stop" command is received, the method may stop (e.g., the sequence of actions may be stopped and/or reversed to resume normal operation of the vehicle). In some examples, the in-vehicle system may regularly poll for the "Stop" command during performance of the method 500.

At 504, the method includes determining if a speed of the vehicle is above a threshold speed. The threshold speed may be a predetermined speed below which the in-vehicle computing system may be conditioned to perform certain actions to ensure well-being of the user and avoid any accident, for example. In some examples, the in-vehicle computing system may perform a sequence of actions when the vehicle has come to a complete halt. In such examples, the threshold speed may be set as zero.

If the vehicle speed is above the threshold speed (e.g., "YES" at 504), then method 500 proceeds to 506 where the vehicle speed is reduced to below threshold speed over a predetermined time. As an example, if the vehicle is travelling in the highway at 55 mph, and the threshold speed for the system is 0 mph, for example, then instead of abruptly stopping the vehicle once "Start" command is received, the method includes decreasing the speed of the vehicle gradually by engaging automatic braking routines of the vehicle over certain time. While engaging automatic braking routine of the vehicle to reduce the speed, there may be additional routines that may also be engaged, which may include maneuvering the vehicle slowly towards the breakdown lanes of the highway, for example. Further still, automatic control routines of the vehicle may be engaged. Engaging autopilot and/or automatic control routine of the vehicle may include disengaging driver control of the vehicle by decreasing an amount of control of the vehicle provided by the driver of the vehicle (also referred to as manual control of the vehicle), and increasing an amount of control of the vehicle automatically provided by one or more vehicle systems (e.g., without driver intervention).

Once the vehicle speed is below the threshold speed, then method 500 proceeds to 508 where a sequence of actions may be performed. Sequence of actions may include unlocking doors and/or windows of the vehicle, as indicated at 510. As such, unlocking the windows and door of the vehicle may enable the user to exit the vehicle.

Further to unlocking the doors and windows, the engine of the vehicle may be immobilized at 512. Immobilizing the vehicle at 512, may include shutting down of the engine of the vehicle, and further including disabling restart of the vehicle for a threshold time. Depending on the type of vehicle (electric, hybrid, gasoline, diesel engine and the like), various methodologies may be employed to immobilize the vehicle without deviating from the scope of the disclosure. The sequence of actions that the in-vehicle computing device performs is continued on FIG. 5B.

In one example of a "Stop" command polling technique, after reducing the speed of the vehicle at 506, the method may proceed to check if a "Stop" command is received from the mobile device of the user. As explained earlier, the user may stop the panic situation at any time by voicing the "Stop" command. Once the mobile device recognizes and matches the voice command, the mobile device may send the "Stop" command to the in-vehicle computing system. As such, the in-vehicle computing system may not accept "Stop" commands from other mobile devices connected to the in-vehicle computing system; only the mobile device that issued the original "Start" command may be allowed to issue the "Stop" command.

Figure 5B:
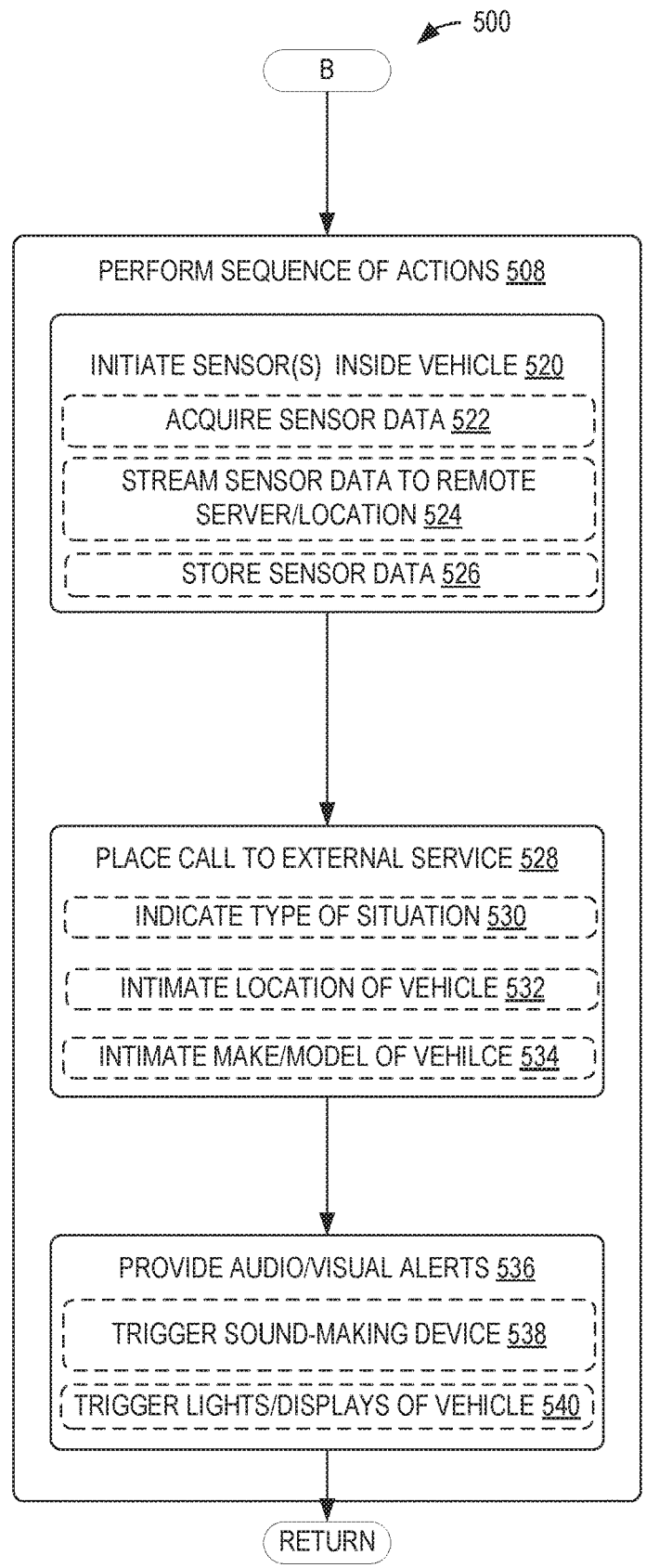

The sequence of actions performed at 508 is continued on in FIG. 5B, and further includes initiating sensor(s) inside of the vehicle at 520, placing a call to an external service at 528, and providing audio/visual alert at 536. As described earlier, the sequence of actions performed at 508 may be interrupted by a "Stop" command anytime while performing the sequence of actions. As such, the method may include checking for the "Stop" command block intermittently, in between or while the sequence of actions listed in 520, 528 and 536. However, in some examples, the "Stop" command block may not be intermittently performed, but instead the sequence of actions may be continuously performed and be interrupted only if the in-vehicle computing system receives the "Stop" command from the mobile device.

At 520, performing the sequence of actions further includes initiating/initializing the sensor(s) inside of the vehicle. Initializing the sensor(s) may include turning on sensors of the vehicle, such as, but not-limited to, cabin cameras, front facing cameras, rear-facing cameras, and the like. In addition, microphones located inside the vehicle may be enabled. Next at 522, sensor data from the sensors is acquired. Sensor data may include one or more of image data from the cameras, voice/noise data detected by the microphone, and the like. Then, at 524, the acquired sensor data may be streamed to external services located remote to the vehicle. The external services may include one or more of a call center/operator, emergency service centers, and the like. Further, at 526, the sensor data acquired at 522 may be stored in a memory (such as memory 216) of the in-vehicle computing system. For example, if there is any network error while streaming the sensor data to the external services, the stored sensor data may be retrieved at a later point. In this way, emergency services may be alerted and evidence may be gathered which may be submitted to the authority when requested.

Method 500 proceeds to 528 where a call is placed to the external services. Once a connection is established, if the user is in a position to communicate, then the user may be able to directly convey the situation and request assistance from the external services. However, if the user is unable to communicate, the in-vehicle computing system may be able to indicate type of situation (at 530), intimate location vehicle (at 532) and indicate make/model of vehicle (at 534) for aiding the emergency services to locate the vehicle and provide assistance in a prompt manner. Examples of types of situations include medical, accident, harassment, drunk driving, burglary, and the like. In some examples, if the in-vehicle computing system is several tasks in parallel, some of the actions may be allocated to the mobile device. For example, the mobile device may be used to place the call to the external services, acquire and transmit image data, and the like.

Method 500 proceeds to 536, where audio/visual alerts are provided. Providing audio alerts may include triggering a sound making device of the vehicle to continuously or intermittently honk, for example. Further, providing visual alerts may include triggering lights or displays of the vehicle (flashing head lights of the vehicle, for example). In this way, individuals/neighboring vehicles may be alerted of the situation of the current vehicle. As such, the sequence of actions 508 may be performed in any order (sequentially or in random order, based on the situation type as detected by the mobile device and/or in-vehicle computing system), and may further be interrupted at any time by the user by issuing the stop command. In some examples, one or more of the sequence of actions described at 508 may be omitted, such that only a subset of the actions 510, 512, and 520-540 are performed.

In a first example, if a driver of a cab is harassing the user and the cab is parked in a shopping mall, the user may issue a voice command to the mobile device. Upon receiving the voice command and determining that the voice command corresponds to the saved "start" command for the user, the mobile device may transmit the start command to the in-vehicle computing system of the cab. The in-vehicle computing system may then unlock the doors/windows of the cab (e.g., via a command signal provided to one or more actuators of the cab associated with the doors/windows), and provide audio/visual alerts by intermittent honking and flashing of head light (e.g., via a command signal provided to one or more actuators or controllers of the cab associated with the horn and/or lights of the cab). As such, the user may be able to step outside the cab when the door is unlocked. In addition, the audio and visual alerts may grab the attention of individuals nearby, and the user may feel secure that the user may issue the stop command. The remainder of the actions (508) may then be interrupted.

In a second example, the user while driving the vehicle on the highway, suddenly experiences a medical issue. The mobile device may be able to perceive and infer a panic situation based on a spike in the user's heart rate, for example. The mobile device may then issue the start command to the in-vehicle computing system. The in-vehicle computing system, in turn may begin to slowly decrease the vehicle speed, while maneuvering the vehicle to the breakdown lane, for example. Once the vehicle is secured and parked in the breakdown lane, the system may automatically place a call to the emergency services (e.g., without intervention or instruction from the user), and request for medical help. In addition, based on navigation data, the system may be able to automatically transmit a location of the vehicle. At this point, the user may intervene and utter the stop command to stop the system from performing the remainder of the actions if the user recovers from the medical issue.

In a third example, a user while travelling in a cab in a remote location, may be intimidated by the driver of the cab. When threatened by the driver, the user may whisper the start command to the mobile device, without alerting the driver. The mobile device may then issue the start command to the in-vehicle computing system of the cab, which may turn on the cabin camera and microphone and start recording and saving the image and voice data. Further, the system may automatically transmit the data to an external service and request help. Once help arrives, if the driver denies the allegations from the user, the saved data may be submitted as evidence, thereby assisting the user.

Thus, an example in-vehicle computing system of a vehicle is shown, the in-vehicle computing system may include an external device interface communicatively connecting the in-vehicle computing system to a mobile device, an inter-vehicle system communication module communicatively connecting the in-vehicle computing system to one or more vehicle systems of the vehicle, a processor; and a storage device. The storage device may be configured to store instructions executable by the processor to receive a first command from the mobile device via the external device interface; and perform actions on a selected vehicle system of the one or more vehicle systems until receiving a second command from the same mobile device, each of the first command and the second command capable of being recognized by the mobile device based on one or more of a voice command issued by a user of the mobile device, and analysis performed by the mobile device. Additionally or alternatively, performing the actions may include responsive to a vehicle speed of the vehicle being lower than a threshold speed, perform the actions and responsive to the vehicle speed being higher than the threshold speed, reduce the vehicle speed below the threshold speed over a predetermined time and then perform the actions. Additionally or alternatively, the instructions may be further executable to reduce the vehicle speed by engaging automatic control routines of the vehicle. Additionally or alternatively, performing the actions may include unlocking doors or windows of the vehicle and further includes immobilizing an engine of the vehicle. Additionally or alternatively, the system may include a sensor subsystem communicatively coupled to sensors of the system, and wherein the instructions are further executable to acquire and storing sensor data from the sensors in the sensor subsystem; and send acquired sensor data to a remote location via the external device interface. Additionally or alternatively, the system may further include a navigation subsystem, and wherein performing the actions further includes placing a call to an external service, and communicating one or more of a location of the vehicle based on navigational data from the navigation subsystem, an identification of the vehicle, and a type of situation to an external service, the external service being remote from the vehicle. Additionally or alternatively, performing the actions may include presenting an audio warning and a visual warning, wherein the audio warning comprises triggering a sound-making device of the vehicle, and the visual warning comprises triggering lights or a display of the vehicle.

An example method is shown, where the method includes receiving a start command from a mobile device of a user, receiving a vehicle data from one or more vehicle systems, the vehicle data including a speed of the vehicle. Responsive to determining that the speed is above the threshold speed, the method may additionally or alternatively include adjusting vehicle operation to reduce the speed over a predetermined time; and performing actions on the vehicle systems once the speed is below the threshold speed. Additionally or alternatively, the method may further include stopping the actions responsive to receiving a stop command from the mobile device, the start command and the stop command determined based on user data. Additionally or alternatively, the method may further include stopping the actions only when each of the stop command and the start command originate from the mobile device. Additionally or alternatively, the user data may include one or more of a device data, a voice data of the user, and a biometric data of the user. Additionally or alternatively, performing the actions may include performing one or more of unlocking doors or windows of the vehicle, and immobilizing the vehicle, wherein the immobilizing includes shutting down of an engine of the vehicle and further disabling restart of the engine for a certain time. Additionally or alternatively, performing the actions may include performing one or more of starting one or more cameras of the vehicle, acquiring and storing image data from the cameras, establishing connection to an external source, and sending the acquired image data to the external source, the external source being remote from the vehicle. Additionally or alternatively, establishing connection to the external source may include sending vehicle location and vehicle identification to the external source; and sending a condition of the vehicle and the user to the external source, the condition based on the user data.

Figure 6:
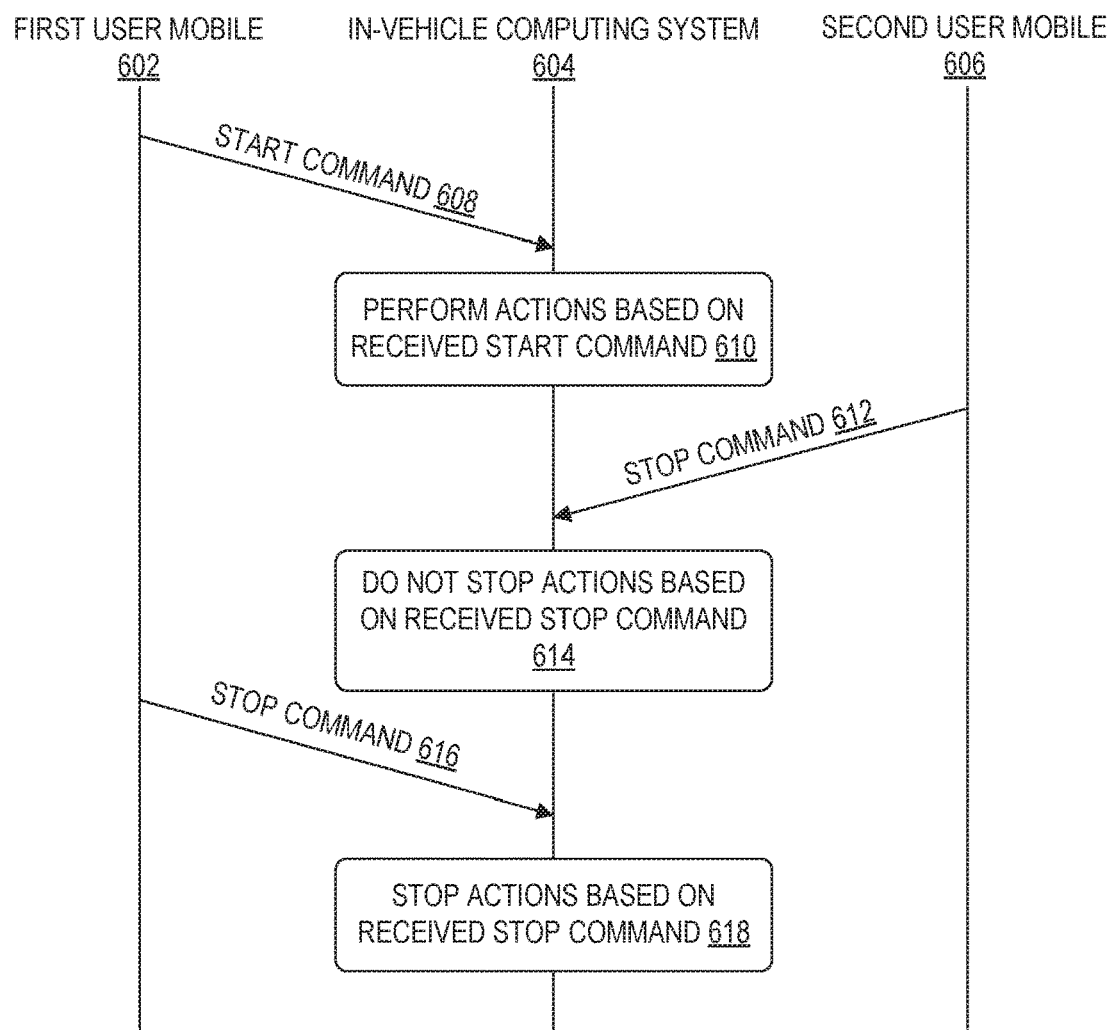
FIG. 6 shows a diagram of an example communication occurring between the mobile device of a first user and a second user and the in-vehicle computing system in accordance with one or more embodiments of the present disclosure.

As described earlier, the mobile device may accept the stop command only if it is issued by the same user using the same mobile device. To elucidate, an example situation, where there are multiple users in a vehicle and multiple mobile devices capable of connecting to the in-vehicle computing device of the vehicle, is shown in FIG. 6. Specifically, diagram 600 shows communications occurring between the mobile device of a first user and a second user and the in-vehicle computing system in accordance with one or more embodiments of the present disclosure.

A first user mobile 602 issues a start command 608 to the in-vehicle computing system 604 of the vehicle. The start command 608 may be issued by the first user mobile based on a voice command received from the first user. Additionally or alternatively, the first user mobile may determine a panic situation based on a sudden change in biometric identifiers of the first user, and subsequently issue the start command 608 to the in-vehicle computing system 604. For example, the first user may feel that the second user is being rough or unreasonable and may issue the start command to the first user mobile 602.

Based on the received start command, the in-vehicle computing system 604 may begin performing one or more of the series of actions as explained earlier (e.g., in FIGS. 5A-5B), as indicated at 610. Briefly, the in-vehicle computing system may reduce vehicle speed by engaging automatic control of the vehicle, unlock doors and windows of the vehicle, and further immobilize the vehicle. The system may further start acquiring, saving, and transmitting sensor data, and further contact external services and request for assistance. Furthermore, the system may provide audio and visual alerts to notify individuals in the vicinity of the vehicle and request assistance.

While the in-vehicle computing system 604 is performing the sequence of actions, the second user in the vehicle may become aware of the situation, and may further try to stop the system from completing the sequence of actions by issuing a stop command 612 via the second user mobile 606. Incidentally, the second user mobile 606 is also connected to the in-vehicle computing system 606. As such, the second user mobile 606 may include a set of start and stop commands personalized to the second user. The second user may issue the stop command to the second user mobile 606. Recognizing the stop command of the second user, the second user mobile may then communicate the stop command 612 to the in-vehicle computing system 604.

However, the in-vehicle computing system 604 may recognize that the stop command 612 did not originate from the same mobile device that originally issued the start command 608. Hence, the in-vehicle computing system 604 may ignore/discard the stop command 612 issued by the second user mobile 606 and may not stop the actions based on the received stop command (614). In another example, the stop command 612 may not be issued, as the second user mobile 606 may identify that the stop command was not uttered after receipt of a start command recognized by the second user mobile (e.g., the user that uttered the stop command was not the user that uttered the start command). In other words, the second user mobile 606 may only issue a stop command if a valid start command was issued by the second user mobile 606 within a threshold period of time prior to receiving the stop command.

When first user decides to stop the actions and issues the stop command to the first user mobile 602, the first user mobile 602 may recognize the voice and the content of the first user, and send a stop command 616 to the in-vehicle computing system 604. Recognizing that the stop command 616 originated from the first user mobile 602 that also issued the start command 608, the in-vehicle system 604, may stop performing the actions at 618. In this way, by using personalized voice commands and by further tracking the origin of the start and the stop commands, the system may be able to identify falsely issued commands and reject them.

In this way, when the user is in distress and needs help, the mobile device may be able to recognize the situation based on voice commands issued by the user. Furthermore, the mobile device may communicate to the in-vehicle computing systems, which then performs a series of actions to get help for the user by contacting the appropriate services. A technical effect of the mobile device communicating directly to the in-vehicle computing system, is that it offers a hands-free way of requesting help and assistance for the user. Another technical effect of the disclosure is that it offers a wireless communication mechanism for communicating the panic commands, thereby reducing any chances of tampering with the system. Yet another technical effect of the disclosure is that the voice based commands may be issued from any location, thus the panic commands may be triggered from a wide range of locations relative to the in-vehicle computing system.

The systems and methods described above provide for an in-vehicle computing system of a vehicle, the in-vehicle computing system comprising an external device interface communicatively connecting the in-vehicle computing system to a mobile device, an inter-vehicle system communication module communicatively connecting the in-vehicle computing system to one or more vehicle systems of the vehicle, a processor, and a storage device storing instructions executable by the processor to receive a first command from the mobile device via the external device interface, and perform actions on a selected vehicle system of the one or more vehicle systems until receiving a second command from the same mobile device, each of the first command and the second command capable of being recognized by the mobile device based on one or more of a voice command issued by a user of the mobile device, and analysis performed by the mobile device. In a first example of the driver assistance system, the system may additionally or alternatively include wherein performing the actions comprises responsive to a vehicle speed of the vehicle being lower than a threshold speed, perform the actions, and responsive to the vehicle speed being higher than the threshold speed, reduce the vehicle speed below the threshold speed over a predetermined time and then perform the actions. A second example of the driver assistance system optionally includes the first example, and further includes wherein the instructions are further executable to reduce the vehicle speed by engaging automatic control routines of the vehicle. A third example of the driver assistance system optionally includes one or more of the first and the second examples, and further includes wherein performing the actions includes unlocking doors or windows of the vehicle and further includes immobilizing an engine of the vehicle. A fourth example of the driver assistance system optionally includes one or more of the first through the third examples, and further includes a sensor subsystem communicatively coupled to sensors of the system, and wherein the instructions are further executable to acquire and storing sensor data from the sensors in the sensor subsystem, and send acquired sensor data to a remote location via the external device interface. A fifth example of the driver assistance system optionally includes one or more of the first through the fourth examples, and further includes a navigation subsystem, and wherein performing the actions further includes placing a call to an external service, and communicating one or more of a location of the vehicle based on navigational data from the navigation subsystem, an identification of the vehicle, and a type of situation to an external service, the external service being remote from the vehicle. A sixth example of the driver assistance system optionally includes one or more of the first through the fifth examples, and further includes wherein performing the actions includes presenting an audio warning and a visual warning, wherein the audio warning comprises triggering a sound-making device of the vehicle and the visual warning comprises triggering lights or a display of the vehicle.

The systems and methods described above also provide for a method for an in-vehicle computing system of a vehicle, the method comprising receiving a start command from a mobile device of a user, receiving a vehicle data from one or more vehicle systems, the vehicle data including a speed of the vehicle, responsive to determining that the speed is above the threshold speed, adjusting vehicle operation to reduce the speed over a predetermined time; and performing actions on the vehicle systems once the speed is below the threshold speed. In a first example of the method, the method may additionally or alternatively include stopping the actions responsive to receiving a stop command from the mobile device, the start command and the stop command determined based on user data. A second example of the method optionally includes the first example, and further includes stopping the actions only when each of the stop command and the start command originate from the mobile device. A third example of the method optionally includes one or more of the first and the second example, and further includes wherein the user data includes one or more of a device data, a voice data of the user and a biometric data of the user. A fourth example of the method optionally includes one or more of the first through the third example, and further includes wherein performing the actions includes performing one or more of unlocking doors or windows of the vehicle, and immobilizing the vehicle, wherein the immobilizing includes shutting down of an engine of the vehicle and further disabling restart of the engine for a certain time. A fifth example of the method optionally includes one or more of the first through the fourth example, and further includes wherein performing the actions includes performing one or more of starting one or more cameras of the vehicle, acquiring and storing image data from the cameras, establishing connection to an external source, and sending the acquired image data to the external source, the external source being remote from the vehicle. A sixth example of method optionally includes one or more of the first through the fifth example, and further includes wherein establishing connection to the external source further comprises sending vehicle location and vehicle identification to the external source, and sending a condition of the vehicle and the user to the external source, the condition based on the user data.

The systems and methods described above also provide for a mobile device, the device comprising a sensor module communicatively coupled to sensors of the mobile device, a communication module configured to receive information from a user of the mobile device and transmit information to an in-vehicle computing system of a vehicle, a processor; and a storage device storing instructions executable by the processor to: identify a current situation based on a change in parameters, the change determined based on an output of the sensors, present a notification of an impending start command to the user, in response to receiving a stop command from the user, not sending the start command to the in-vehicle computing system of the vehicle; and if the stop command is not received within a threshold time from the user, send the start command to the in-vehicle computing device of a vehicle via the communication module, the start command configured to cause an action in the vehicle. In a first example of the device, the device may additionally or alternatively include wherein the instructions are further executable to discard the stop command if the stop command is different to a first stop command stored in the mobile device, the first stop command being selected by the user. A second example of the device optionally includes the first example, and further includes wherein the instructions are further executable to discard the stop command if the stop command is given by a different user. A third example of the device optionally includes one or more of the first and the second example, and further includes wherein the sensors include one or more of a heart rate monitor, a temperature sensor, a motion sensor, and an audio sensor. A fourth example of the device optionally includes one or more of the first through the third examples, and further includes wherein the parameters include one or more of a voice level of the user, a heart rate of the user, and a body temperature of the user, based on the output of the sensors, and wherein the change includes the parameters varying by threshold amounts within a threshold duration. A fifth example of the device optionally includes one or more of the first through the fourth examples, and further includes wherein the stop command is configured to stop the action in the vehicle.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 described with reference to FIG. 1 and/or in-vehicle computing system 200 described with reference to FIG. 2, and/or mobile device 702 of FIG. 7. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system of a vehicle, the in-vehicle computing system comprising:
    an external device interface communicatively connecting the in-vehicle computing system to a mobile device;
    an inter-vehicle system communication module communicatively connecting the in-vehicle computing system to two or more vehicle systems of the vehicle;
    a processor; and
    a storage device storing instructions executable by the processor to:
        receive a first command from the mobile device via the external device interface; and
        perform a sequence of actions on two or more selected vehicle systems of the two or more vehicle systems according to the first command until receiving a second command from the same mobile device, the first command transmitted by the mobile device to the in-vehicle computing system based on one or more of a voice command issued by a user of the mobile device and analysis performed by the mobile device, the second command transmitted by the mobile device to the in-vehicle computing system responsive to the mobile device sensing a vocal stop command by the user.

2. The in-vehicle computing system of claim 1, wherein performing the sequence of actions comprises:
    responsive to a vehicle speed of the vehicle being lower than a threshold speed, perform the sequence of actions; and
    responsive to the vehicle speed being higher than the threshold speed, reduce the vehicle speed below the threshold speed over a predetermined time and then perform the sequence of actions.

3. The in-vehicle computing system of claim 2, wherein the instructions are further executable to reduce the vehicle speed by engaging automatic control routines of the vehicle.

4. The in-vehicle computing system of claim 1, wherein performing the sequence of actions includes unlocking doors or windows of the vehicle and further includes immobilizing an engine of the vehicle.

5. The in-vehicle computing system of claim 1, further comprising a sensor subsystem communicatively coupled to sensors of the in-vehicle computing system, and wherein the instructions are further executable to:
    acquire and store sensor data from the sensors in the sensor subsystem; and
    send the acquired sensor data to a remote location via the external device interface.

6. The in-vehicle computing system of claim 1, further comprising a navigation subsystem, wherein performing the sequence of actions further includes placing a call to an external service, and communicating two or more of a location of the vehicle based on navigational data from the navigation subsystem, an identification of the vehicle, and a type of situation to the external service, the external service being remote from the vehicle.

7. The in-vehicle computing system of claim 1, wherein performing the sequence of actions includes presenting an audio warning and a visual warning, wherein the audio warning comprises triggering a sound-making device of the vehicle and the visual warning comprises triggering lights or a display of the vehicle.

8. A method for an in-vehicle computing system of a vehicle, the method comprising:
receiving a start command from a mobile device of a user;
receiving vehicle data from one or more vehicle systems, the vehicle data including a speed of the vehicle;
responsive to determining that the speed is above a threshold speed, adjusting vehicle operation to reduce the speed over a predetermined time;
performing a sequence of actions on two or more vehicle systems including the one or more vehicle systems according to the start command once the speed is below the threshold speed; and
stopping the sequence of actions responsive to receiving a stop command from the mobile device, the stop command transmitted by the mobile device to the in-vehicle computing system responsive to the mobile device sensing a vocal stop command by the user.

9. The method of claim 8, wherein the start command is determined based on user data.

10. The method of claim 9, further comprising stopping the sequence of actions only when each of the stop command and the start command originate from the mobile device.

11. The method of claim 9, wherein the user data includes one or more of device data, voice data of the user, and biometric data of the user.

12. The method of claim 8, wherein performing the sequence of actions includes performing one or more of unlocking doors or windows of the vehicle and immobilizing the vehicle, wherein the immobilizing includes shutting down of an engine of the vehicle and further disabling restart of the engine for a certain time.

13. The method of claim 9, wherein performing the sequence of actions includes performing one or more of:
starting one or more cameras of the vehicle;
acquiring and storing image data from the one or more cameras;
establishing a connection to an external source; and
sending the acquired image data to the external source, the external source being remote from the vehicle.

14. The method of claim 13, wherein establishing the connection to the external source further comprises:
sending vehicle location and vehicle identification to the external source; and
sending a condition of the vehicle and the user to the external source, the condition based on the user data.

15. A mobile device, comprising:
a sensor module communicatively coupled to sensors of the mobile device;
a communication module configured to receive information from a user of the mobile device and transmit information to an in-vehicle computing system of a vehicle;
a processor; and
a storage device storing instructions executable by the processor to:
identify a current situation based on a change in parameters, the change determined based on an output of the sensors;
present a notification of an impending start command to the user;
in response to receiving a stop command from the user, the stop command comprising a vocal command received via the sensor module,
not sending the start command to the in-vehicle computing system of the vehicle; and
if the stop command is not received within a threshold time from the user, send the start command to the in-vehicle computing system of the vehicle via the communication module, the start command configured to cause an action in the vehicle.

16. The mobile device of claim 15, wherein the instructions are further executable to discard the stop command if the stop command is different from a first stop command stored in the mobile device, the first stop command being selected by the user.

17. The mobile device of claim 15, wherein the instructions are further executable to discard the stop command if the stop command is given by a different user.

18. The mobile device of claim 15, wherein the sensors include one or more of a heart rate monitor, a temperature sensor, a motion sensor, and an audio sensor.

19. The mobile device of claim 18, wherein the parameters include one or more of a voice level of the user, a heart rate of the user, and a body temperature of the user based on the output of the sensors, and wherein the change includes the parameters varying by threshold amounts within a threshold duration.

20. The mobile device of claim 15, wherein the stop command is configured to stop the action in the vehicle.

* * * * *